United States Patent
Teraoka

(10) Patent No.: US 9,804,365 B2
(45) Date of Patent: Oct. 31, 2017

(54) CAMERA LENS

(71) Applicant: Hiroyuki Teraoka, Shenzhen (CN)

(72) Inventor: Hiroyuki Teraoka, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 5 days.

(21) Appl. No.: 15/080,315

(22) Filed: Mar. 24, 2016

(65) Prior Publication Data
US 2017/0023770 A1    Jan. 26, 2017

(30) Foreign Application Priority Data
Jul. 24, 2015 (JP) ................. 2015-146321

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
CPC .. G02B 9/60–9/64; G02B 13/00–13/08; G02B 15/10–15/177
USPC ................................. 359/763–764
See application file for complete search history.

(56) References Cited

U.S. PATENT DOCUMENTS

| | | | | |
|---|---|---|---|---|
| 6,618,197 B1* | 9/2003 | Hayakawa | ............... | G02B 9/60 359/557 |
| 8,885,269 B2* | 11/2014 | Shinohara | .......... | G02B 13/0045 359/714 |
| 9,146,380 B2* | 9/2015 | Kubota | ............... | G02B 13/0045 |
| 9,279,962 B2* | 3/2016 | Kanda | ................ | G02B 13/0045 |
| 9,715,087 B2* | 7/2017 | Teraoka | ............ | G02B 13/0045 |
| 2012/0262806 A1* | 10/2012 | Huang | ............... | G02B 13/0045 359/784 |
| 2014/0320984 A1* | 10/2014 | Kubota | .................... | G02B 9/60 359/714 |
| 2015/0077865 A1* | 3/2015 | Yoneyama | .......... | G02B 13/0045 359/714 |
| 2015/0146306 A1* | 5/2015 | Yonezawa | .......... | G02B 13/0045 359/714 |
| 2015/0168687 A1* | 6/2015 | Kondo | ............... | G02B 13/0045 359/714 |

* cited by examiner

*Primary Examiner* — Bumsuk Won
*Assistant Examiner* — Jeffrey Madonna
(74) *Attorney, Agent, or Firm* — Na Xu; IPro, PLLC

(57) ABSTRACT

The present invention discloses a camera lens composed of five ultrathin and high-luminous flux wide angle lenses with excellent optical properties. The lenses are lined up in turn from the object side as follows: a first lens with positive refractive power, a second lens with negative refractive power, a third lens with negative refractive power, a fourth lens with positive refractive power a fifth lens with negative refractive power. The camera lens meets specific conditions.

6 Claims, 5 Drawing Sheets

CAMERA LENS

FIELD OF THE DISCLOSURE

The present invention discloses a camera lens, especially relates to the camera lens of small camera, optical sensor, mobile phone camera, WEB camera head etc. equipped with high pixel CCD, CMOS and other camera elements.

BACKGROUND

In recent years, a variety of cameras equipped with CCD, CMOS and other camera elements are widely available. Along with the miniature and high performance development of the camera elements, the camera lens composed of ultrathin and high-luminous flux F (Fno) wide-angle lenses with excellent optical properties is needed in market.

The technology related to the camera lens composed of 5 ultrathin and high-luminous flux f (Fno) wide angle lenses with excellent optical properties is developed gradually. The camera lens mentioned in the technological development proposal is composed of five lenses, which are lined up from the object side as follows: a first lens with positive refractive power, a second lens with negative refractive power, a third lens with negative refractive power, a fourth lens with positive refractive power, a fifth lens with negative refractive power.

The camera lens disclosed in embodiments 1-5 of the JP Patent Publication No. 2015-072424 is composed of five lenses, but the distribution of refractive power of the first lens and the second lens is inadequate, the shape of the first lens and the second lens is improper, and the proportion of the center thickness of the forth lens and the overall focus distance of the camera lens is not proper, Fno≥2.25, 2ω≤74.6° wide angle and ultrathin degree are not sufficient, and luminous flux Fno is not sufficient.

The camera lens disclosed in embodiments 1-4 of the JP Patent Publication NO. 2015-060171 is composed of five lenses, but the configuration of refractive power of the third lens is inadequate, the shape of the first lens and the second lens is improper, and the proportion of the center thickness of the forth lens and the overall focus distance of the camera lens is not proper. Therefore, Fno≥2.25, 2ω≤75.6 wide angle are not sufficient, and luminous flux Fno is not sufficient.

Therefore, it is desired to provide a new camera lens which can overcome the aforesaid problem.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The present disclosure will be described in detail below with reference to the attached drawings and exemplary embodiments thereof.

Figure 1:
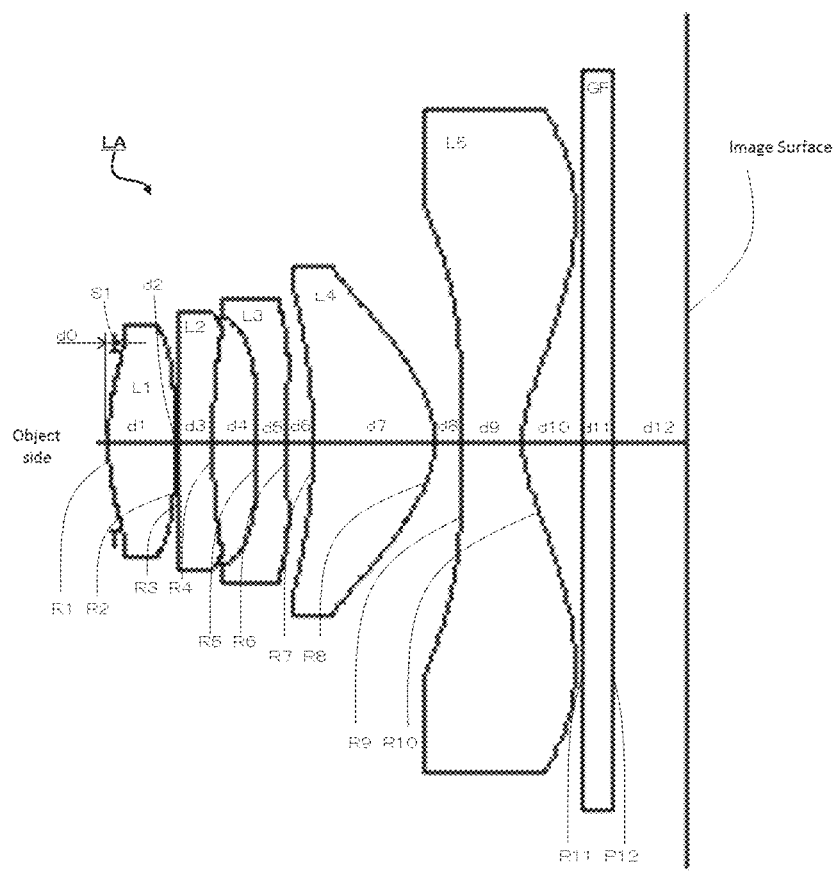
FIG. 1 is the structural diagram of the camera lens LA relevant in one embodiment of the present invention.

FIG. 1 shows the structural diagram of one embodiment of the camera lens of the present invention. The camera lens LA includes five lenses lined up from the object side to the image side as follows: a first lens L1, a second lens L2, a third lens L3, a fourth lens L4, as well as a fifth lens L5. A glass plate GF is provided between the fifth lens L5 and the imaging plane. The glass plate GF is a cover glass, or a light filter having IR cut-off filtration and other functions, or the glass plate GF is not be provided between the fifth lens L5 and the imaging plane.

The first lens L1 has positive refractive power. The second lens L2 has negative refractive power. The third lens L3 has negative refractive power. The fourth lens L4 has positive refractive power. The fifth lens L5 has negative refractive power. In order to correct aberration better, the surface of five lenses is best to be non-spherical shape.

The camera lens LA meets following conditions (1)-(5):

$$0.80 \leq f1/f \leq 1.00 \quad (1)$$

$$-5.00 \leq f3/f \leq -3.00 \quad (2)$$

$$-0.80 \leq (R1+R2)/(R1-R2) \leq -0.30 \quad (3)$$

$$0.05 \leq (R3+R4)/(R3-R4) \leq 0.40 \quad (4)$$

$$0.25 \leq d7/f \leq 0.35 \quad (5)$$

where:

f: The overall focal distance of the camera lens LA.
f1: The focal distance of the first lens.
f3: The focal distance of the third lens.
R1: The curvature radius of the object side of the first lens.
R2: The image side curvature radius of the first lens.
R3: The object side curvature radius of the second lens.
R4: The image side curvature radius of the second lens.
D7: The center thickness of the fourth lens.

The condition (1) specifies the positive refractive power of the first lens L1. When exceeding the lower limit value of the condition (1), although in favor of the ultrathin development of the lens, the first lens L1 has too big positive refractive power, it is difficult to correct the aberration and other issues and also not conducive to wide-angle development of lens. On the contrary, when exceeding the upper limit value, the first lens has too small positive refractive power, it is difficult to the ultrathin development of lens.

Further, the limit of condition (1) is better set within the range of the condition (1-A) as follows.

$$0.85 \leq f1/f \leq 0.95 \qquad (1\text{-}A)$$

The condition (2) specifies the negative refractive power of the third lens L3. If the value exceeds the limit of the condition (2), along with the ultrathin and wide-angle development of the lens, it is difficult to correct Lateral Color aberration.

Further, the limit of the condition (2) is better set within the range of the condition (2-A) as follows.

$$-4.00 \leq f3/f \leq -3.00 \qquad (2\text{-}A)$$

The condition (3) specifies the shape of the first lens L1. If the value exceeds the limit of the condition (3), along with the wide angle and ultrathin development of the lens, it is difficult to correct the Longitudinal Aberration and other higher aberration issues will increase.

Further, the limit of condition (3) is better set within the range of the condition (3-A) as follows:

$$-0.65 \leq (R1+R2)/(R1-R2) \leq -0.40 \qquad (3\text{-}A)$$

The condition (4) specifies the shape of the second lens L2. If the value exceeds the limit of the condition (4), along with the ultrathin and wide-angle development of the lens, it is difficult to correct the axial chromatic aberration.

Further, the limit of the condition (4) is better set within the range of the condition (4-A) as follows:

$$0.10 \leq (R3+R4)/(R3-R4) \leq 0.25 \qquad (4\text{-}A)$$

The condition (5) specifies the proportion of the center thickness of the fourth lens and the overall focus distance of the camera lens LA. If the value exceeds the limit of the condition (5), it is difficult to realize the ultrathin and wide-angle development of lens.

Further, the camera lens LA satisfies the following condition (6):

$$-3.00 \leq f2/f \leq -1.50 \qquad (6)$$

where:
f: Overall focal distance of the camera lens LA.
f2: The focal distance of the second lens.

The condition (6) specifies the negative refractive power of the second lens L2. If the value exceeds the limit of the condition (6), along with the ultrathin and wide-angle development of the lens, it is difficult to correct the axial and abaxial chromatic aberration.

As five lenses of the camera lens LA have the structure described previously and meet all conditions, therefore, the present invention discloses the camera lens with five ultrathin and high-luminous flux lenses with excellent optical properties, TTL (optical length)/IH (image height) $2\omega \geq 88°$, Fno$\leq 2.2$.

Embodiment

The camera lens LA of the present invention is described with the embodiments below. The symbols in each embodiment are represented as follows (the unit of the distance, radius and center thickness is mm):

f: Overall focal distance of the camera lens LA
f1: The focal distance of the first lens L1
f2: The focal distance of the second lens L2
f3: The focal distance of the third lens L3
f4: The focal distance of the fourth lens L4
f5: The focal distance of the fifth lens L5
Fno: F value
2ω: full view angle
S1: Open aperture
R: Curvature radius of optical surface, center curvature radius of the lens.
R1: The object side curvature radius of the first lens L1.
R2: The image side curvature radius of the first lens L1.
R3: The curvature radius of the object side of the second lens L2.
R4: The curvature radius of the image side of the second lens L2.
R5: The curvature radius of the object side of the third lens L3.
R6: The curvature radius of the image side of the third lens L3.
R7: The curvature radius of the object side of the fourth lens L4.
R8: The curvature radius of the image side of the fourth lens L4.
R9: The curvature radius of the object side of the fifth lens L5.
R10: The curvature radius of the image side of the fifth lens L5.
R11: The object side curvature radius of the glass plate GF.
R12: The image side curvature radius of glass plate GF.
d: Center thickness of lenses or the distance between lenses.
d0: Axial distance from the open aperture S1 to the object side of the first lens L1.
d1: The center thickness of the first lens L1.
d2: The axial distance from the image side of the first lens L1 to the object side of the second lens L2.
d3: The center thickness of the second lens L2.
d4: The axial distance from the image side of the second lens L2 to the object side of the third lens L3.
d5: The center thickness of the third lens L3.
d6: The axial distance from the image side of the third lens L3 to the object side of the fourth lens L4.
d7: The center thickness of the fourth lens L4.
d8: The axial distance from the image side of the fourth lens L4 to the object side of the fifth lens L5.
d9: The center thickness of the fifth lens L5.
d10: The axial distance between the image side of fifth lens L5 and the object side of the glass plate GF.
d11: The center thickness of the glass plate GF.
d12: The axial distance from the image side to the imaging plane of the glass plate GF.
nd: Refractive power of d line.
nd1: Refractive power of d line of the first lens L1.
nd2: Refractive power of d line of the second lens L2.
nd3: Refractive power of d line of the third lens L3.
nd4: Refractive power of d line of the fourth lens L4.
nd5: Refractive power of d line of the fifth lens L5.
nd6: Refractive power of d line of glass plate GF.

v: Abbe number.
v1: Abbe number of the first lens L1.
v2: Abbe number of the second lens L2.
v3: Abbe number of the third lens L3.
v4: Abbe number of the fourth lens L4.
v5: Abbe number of the fifth lens L5.
v6: Abbe number of the glass plate GF.
TTL: Optical length (the axial distance from the object side to the imaging plane of the first lens L1).
LB: The axial distance from the image side to the imaging plane of the fifths lens L5 (including the thickness of the glass plate GF).
IH: image height As a matter of convenience, the aspheric surface of all lenses is aspheric surface in following condition (7), but not limited to the polynomial forms of the aspheric surface in the condition (7).

$$Y=(x2/R)/[1+\{1-(k+1)(x2/R2)\}^{1/2}]+A4 \times 4+A6 \times 6+A8 \times 8+A10 \times 10+A12 \times 12+A14 \times 14+A16 \times 16 \quad (7)$$

where, R is the axial curvature radius. K is the cone constant. A4, A6, A8, A10, A12, A14, A16 are aspherical coefficient.

Embodiment 1

Figure 2:
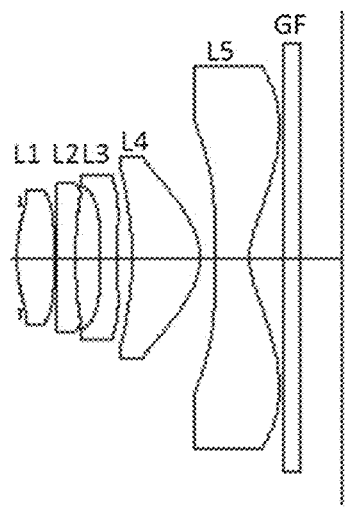
FIG. 2 is the structural diagram of the embodiment 1 of the camera lens LA.

FIG. 2 is the structure diagram of the camera lens LA in the embodiment 1. Table 1 shows the curvature radius R of the object side and the image side of the first lens L1 to the fifth lens L5 of the camera lens LA in the embodiment 1, center thickness of the lenses or the distance d between lenses, refractive power nd and Abbe number v. The cone constant k and aspherical coefficient are shown in table 2.

The values in the embodiments 1-2 and the corresponding values of the parameters specified in the conditions (1)-(6) are listed in following table 5.

As shown in table 5, the embodiment 1 satisfies the conditions (1)-(6).

Figure 3:
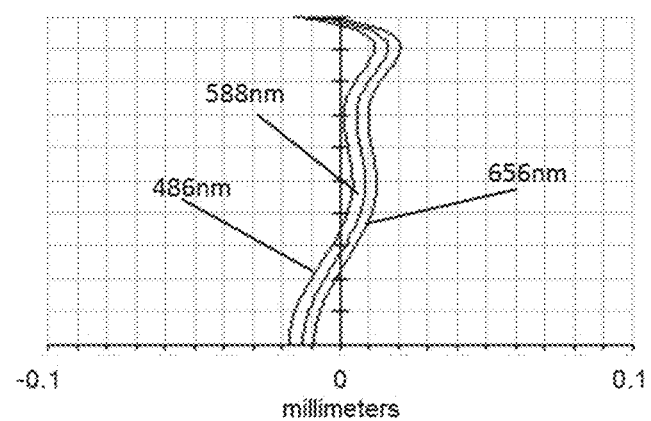
FIG. 3 is the diagram of the Longitudinal Aberration (axial chromatic aberration) of the camera lens LA in the embodiment 1.
Figure 4:
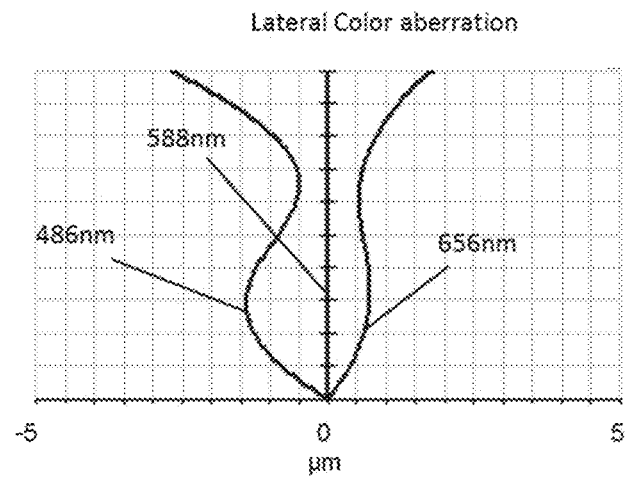
FIG. 4 is the diagram of the Lateral Color aberration of the camera lens LA in the embodiment 1.
Figure 5:
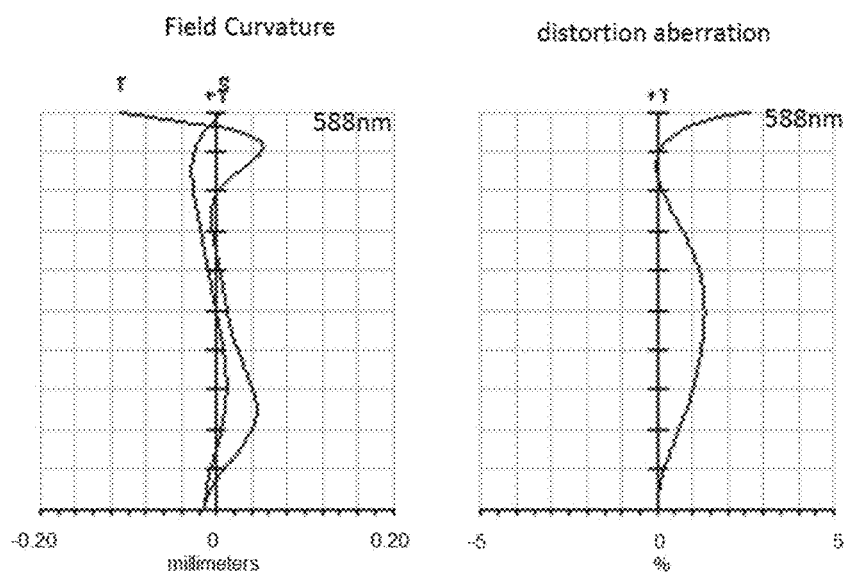
FIG. 5 is the diagram of the Field Curvature and distortion aberration of the camera lens LA in the embodiment 1.

FIG. 3 is the diagram of the Longitudinal Aberration (axial chromatic aberration) of the camera lens LA in the embodiment 1. FIG. 4 is the diagram of the Lateral Color aberration. FIG. 5 is the diagram of the Field Curvature and distortion aberration. In addition, the Field Curvature S in FIG. 5 is the Field Curvature relative to sagittal plane. T is the Field Curvature relative to the tangent image side. It is same also in embodiment 2. In embodiment 1, the camera lens is composed of ultrathin and high-luminous flux wide-angle lenses, LA 2ω=92.4°, TTL/IH=1.333, Fno=2.15. As shown in FIGS. 3 to 5, it is easy to understand that the camera lens has excellent optical properties.

Embodiment 2

Figure 6:
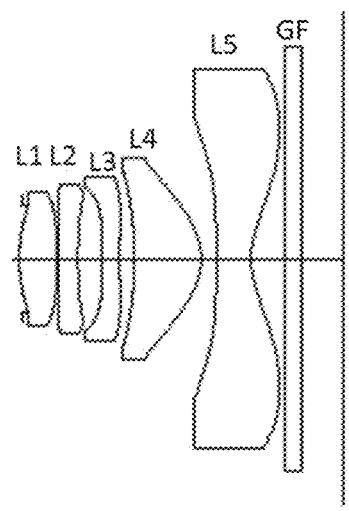
FIG. 6 is the structural diagram of the embodiment 2 of the camera lens LA.

FIG. 6 is the structural diagram of the camera lens LA in the embodiment 2. The curvature radius R of the object side and the image side of the first lens L1 to the fifth lens L5, center thickness of the lenses or the distance d between lenses, refractive power nd, Abbe number v of the camera lens LA in embodiment 2 are shown in table 3. The cone constant k and aspherical coefficients are shown in table 4.

TABLE 1

|  | R | d | nd | v d |
|---|---|---|---|---|
| S1 | ∞ | d0 = −0.050 | | |
| R1 | 1.75995 | d1 = 0.452 | nd1 1.5441 | v 1 56.12 |
| R2 | −5.74958 | d2 = 0.020 | | |
| R3 | −9.24645 | d3 = 0.234 | nd2 1.6422 | v 2 22.41 |
| R4 | 7.28377 | d4 = 0.285 | | |
| R5 | 12.37519 | d5 = 0.207 | nd3 1.6422 | v 3 22.41 |
| R6 | 4.41188 | d6 = 0.182 | | |
| R7 | −4.31148 | d7 = 0.820 | nd4 1.5441 | v 4 56.12 |
| R8 | −0.68868 | d8 = 0.178 | | |
| R9 | −4713.49462 | d9 = 0.417 | nd5 1.5352 | v 5 56.12 |
| R10 | 0.80237 | d10 = 0.400 | | |
| R11 | ∞ | d11 = 0.210 | nd6 1.5168 | v 6 64.17 |
| R12 | ∞ | d12 = 0.506 | | |

TABLE 3

|  | R | d | nd | v d |
|---|---|---|---|---|
| S1 | ∞ | d0 = −0.050 | | |
| R1 | 1.76491 | d1 = 0.454 | nd1 1.5441 | v 1 56.12 |
| R2 | −5.69055 | d2 = 0.020 | | |
| R3 | −9.23472 | d3 = 0.235 | nd2 1.6422 | v 2 22.41 |
| R4 | 7.26028 | d4 = 0.285 | | |
| R5 | 12.47803 | d5 = 0.210 | nd3 1.6422 | v 3 22.41 |
| R6 | 4.41129 | d6 = 0.184 | | |
| R7 | −4.31816 | d7 = 0.805 | nd4 1.5441 | v 4 56.12 |
| R8 | −0.68888 | d8 = 0.177 | | |
| R9 | −449.18797 | d9 = 0.416 | nd5 1.5352 | v 5 56.12 |
| R10 | 0.80331 | d10 = 0.400 | | |
| R11 | ∞ | d11 = 0.210 | nd6 1.5168 | v 6 64.17 |
| R12 | ∞ | d12 = 0.513 | | |

TABLE 2

| | cone constanat | aspherical coefficient | | | | | | |
|---|---|---|---|---|---|---|---|---|
|  | k | A4 | A6 | A8 | A10 | A12 | A14 | A16 |
| R1 | 0.0000E+00 | −6.0873E−02 | −2.6825E−02 | −2.4910E−01 | −8.1010E−02 | 1.5730E−01 | 1.1355E−01 | −6.7357E−02 |
| R2 | 0.0000E+00 | −3.1282E−02 | −1.2569E−01 | 2.1527E−02 | −2.8975E−01 | −1.6884E−01 | 3.1833E−01 | 6.9092E−02 |
| R3 | 0.0000E+00 | 1.0548E−01 | 1.0524E−01 | −1.8260E−01 | −1.0915E−01 | 1.7040E−01 | 4.6751E−02 | 2.3712E−01 |
| R4 | 3.7800E+01 | 5.9723E−02 | −3.4732E−02 | 2.4596E−01 | −1.3171E−01 | −6.7702E−01 | −7.7249E−02 | 2.5359E−01 |
| R5 | 7.4752E+01 | −3.3262E−01 | −7.9890E−02 | −1.4858E−01 | 1.7206E−01 | 6.2440E−01 | 4.4069E−01 | −2.1540E+00 |
| R6 | 1.6878E+01 | −2.3859E−01 | −4.8439E−02 | 6.4282E−02 | 1.2643E−02 | −2.3785E−02 | −1.1580E−02 | 2.7741E−02 |
| R7 | 1.7008E+00 | −3.5035E−02 | 1.2614E−01 | −1.0235E−01 | −1.7541E−02 | 2.1029E−02 | 4.1156E−03 | 3.3519E−03 |
| R8 | −3.1784E+00 | −2.1754E−01 | 1.3665E−01 | −1.7188E−02 | −1.2671E−03 | −2.2635E−03 | 1.5955E−03 | 1.6443E−04 |
| R9 | 1.1469E+01 | −6.6299E−02 | 1.1336E−02 | 8.0987E−04 | −1.9840E−04 | 1.1945E−05 | 2.2112E−06 | −1.3939E−06 |
| R10 | −5.8472E+00 | −5.7625E−02 | 1.5379E−02 | −3.3466E−03 | 4.1898E−04 | −2.4309E−05 | −9.1762E−07 | 1.8198E−07 |

TABLE 4

| | cone constanat | aspherical coefficient | | | | | | |
|---|---|---|---|---|---|---|---|---|
| | k | A4 | A6 | A8 | A10 | A12 | A14 | A16 |
| R1 | 0.0000E+00 | −5.8994E−02 | −2.8723E−02 | −2.5229E−01 | −8.4841E−02 | 1.5828E−01 | 1.2873E−01 | −1.6043E−02 |
| R2 | 0.0000E+00 | −3.1140E−02 | −1.2619E−01 | 2.0843E−02 | −2.9136E−01 | −1.7137E−01 | 3.1421E−01 | 6.3860E−02 |
| R3 | 0.0000E+00 | 1.0501E−01 | 1.0479E−01 | −1.8325E−01 | −1.1000E−01 | 1.6169E−02 | 4.5895E−02 | 2.3593E−01 |
| R4 | 3.7842E+01 | 5.9570E−02 | −3.4857E−02 | 2.4617E−01 | −1.3111E−01 | −6.7609E−01 | −7.6024E−02 | 2.5522E−01 |
| R5 | 7.9467E+01 | −3.3208E−01 | −7.9683E−02 | −1.4824E−01 | 1.7267E−01 | 6.2515E−01 | 4.4110E−01 | −2.1544E+00 |
| R6 | 1.6878E+01 | −2.3836E−01 | −4.7864E−02 | 6.4620E−02 | 1.2549E−02 | −2.4356E−02 | −1.2403E−02 | 2.6752E−02 |
| R7 | 1.7598E+00 | −3.4997E−02 | 1.2564E−01 | −1.0285E−01 | −1.7965E−02 | 2.0767E−02 | 3.9586E−03 | 3.2477E−03 |
| R8 | −3.2145E+00 | −2.1739E−01 | 1.3671E−01 | −1.7152E−02 | −1.2729E−03 | −2.2887E−03 | 1.5646E−03 | 1.3598E−04 |
| R9 | −2.9626E+01 | −6.6320E−02 | 1.1332E−02 | 8.0990E−04 | −1.9740E−04 | 1.2511E−05 | 2.4389E−06 | −1.3102E−06 |
| R10 | −5.9904E+00 | −5.7507E−02 | 1.5402E−02 | −3.3436E−03 | 4.1932E−04 | −2.4280E−05 | −9.1697E−07 | 1.8146E−07 |

As shown in table 5, the embodiment 2 meets the condition (1)-(6).

Figure 7:
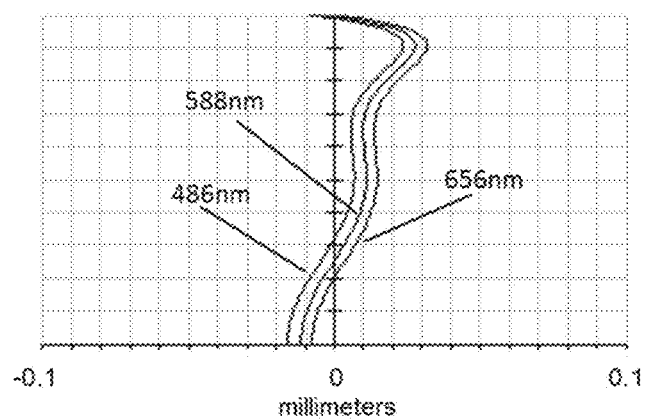
FIG. 7 is the diagram of the Longitudinal Aberration (axial chromatic aberration) of the camera lens LA in the embodiment 2.
Figure 8:
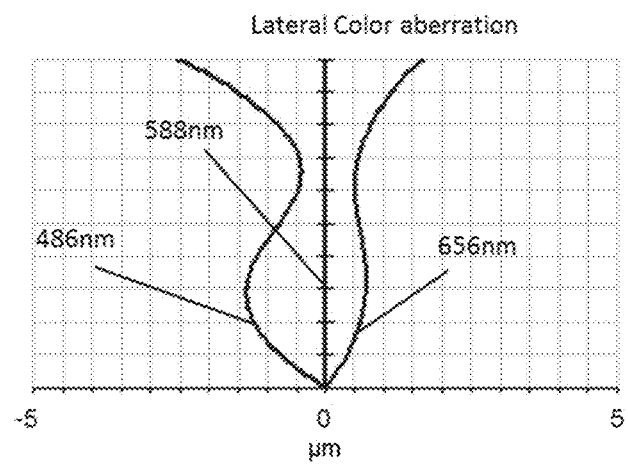
FIG. 8 is the diagram of the Lateral Color aberration of the camera lens LA in the embodiment 2.
Figure 9:
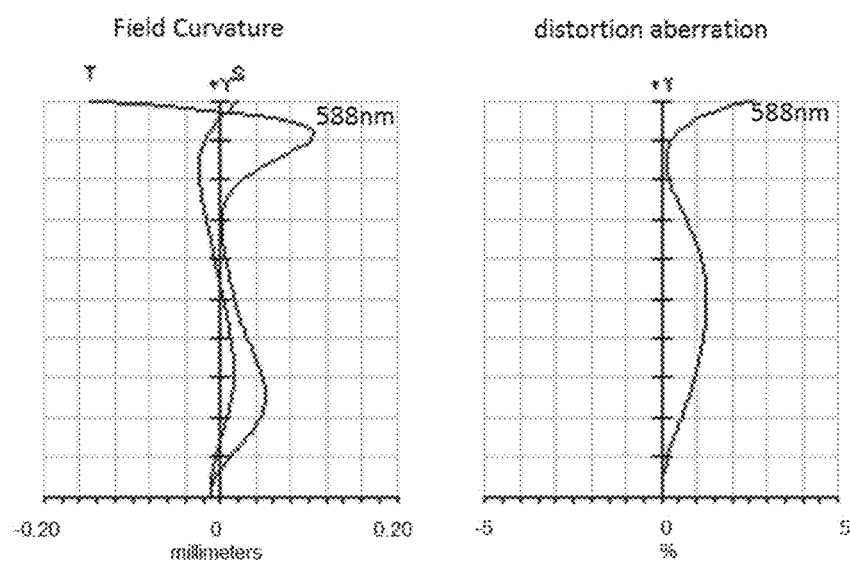
FIG. 9 is the diagram of the Field Curvature and distortion aberration of the camera lens LA in the embodiment 2.

FIG. 7 is the diagram of the Longitudinal Aberration (axial chromatic aberration) of the camera lens LA in the embodiment 2. FIG. 8 is the diagram of the Lateral Color aberration. FIG. 9 is the diagram of the Field Curvature and distortion aberration. As shown in FIGS. 7-9, in the embodiment 2, the camera lens LA is composed of ultrathin and high-luminous flux wide-angle lenses, full image angle 2ω=92.1°, TTL/IH=1.332, Fno=2.15. It is easy to understand that the camera lens has excellent optical properties.

The values of the embodiments and the corresponding values of the parameters specified in the condition (1) to (8) are listed in table 5. In addition, the units in table 7 are respectively 2ω (°), f (mm), f1 (mm), f2 (mm), f3 (mm), f4 (mm), f5 (mm), TTL (mm), LB (mm), IH (mm).

TABLE 5

| | Embodiment 1 | Embodiment 2 | Condition |
|---|---|---|---|
| f1/f | 0.926 | 0.922 | (1) |
| f3/f | −3.949 | −3.914 | (2) |
| (R1 + R2)/(R1 − R2) | −0.531 | −0.527 | (3) |
| (R3 + R4)/(R3 − R4) | 0.119 | 0.120 | (4) |
| d7/f | 0.300 | 0.293 | (5) |
| f2/f | −2.310 | −2.295 | (6) |
| Fno | 2.15 | 2.15 | |
| 2ω | 92.4 | 92.1 | |
| TTL/IH | 1.333 | 1.332 | |
| f | 2.731 | 2.743 | |
| f1 | 2.530 | 2.530 | |
| f2 | −6.309 | −6.294 | |
| f3 | −10.786 | −10.735 | |
| f4 | 1.395 | 1.397 | |
| f5 | −1.499 | −1.498 | |
| TTL | 3.911 | 3.909 | |
| LB | 1.116 | 1.123 | |
| IH | 2.934 | 2.934 | |

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A camera lens, comprising, lined up in turn from the object side:

a first lens with positive refractive power;
a second lens with negative refractive power;
a third lens with negative refractive power;
a fourth lens with positive refractive power;
a fifth lens with negative refractive power; wherein the camera lens satisfying the following specific conditions:

$$0.80 \leq f1/f \leq 1.00$$

$$-5.00 \leq f3/f \leq -3.00$$

$$-0.80 \leq (R1+R2)/(R1-R2) \leq -0.30$$

$$0.05 \leq (R3+R4)/(R3-R4) \leq 0.40$$

$$0.25 \leq d7/f \leq 0.35$$

where, f is the overall focal distance of the camera lens;
f1 is the focal distance of the first lens;
f3 is the focal distance of the third lens;
R1 is the object side curvature radius of the first lens;
R2 is the image side curvature radius of the first lens;
R3 is the object side curvature radius of the second lens;
R4 is the image side curvature radius of the second lens;
d7 is the center thickness of the fourth lens.

2. The camera lens as described in claim 1 further satisfying the following specific condition:

$$-3.00 \leq f2/f \leq -1.50$$

where, f is the overall focal distance of the camera lens, and f2 is the focal distance of the second lens.

3. The camera lens as described in claim 1 further satisfying the following specific condition:

$$0.855 \leq f1/f \leq 0.95.$$

4. The camera lens as described in claim 1 further satisfying the following specific condition:

$$-4.00 \leq f3/f \leq -3.00.$$

5. The camera lens as described in claim 1 further satisfying the following specific condition:

$$-0.65 \leq (R1+R2)/(R1-R2) \leq -0.40.$$

6. The camera lens as described in claim 1 further satisfying the following specific condition:

$$0.10 \leq (R3+R4)/(R3-R4) \leq 0.25.$$

* * * * *